April 16, 1968  H. T. ATWOOD  3,377,965
ROUNDING APPARATUS FOR DOUGH
Filed March 23, 1966  2 Sheets-Sheet 1
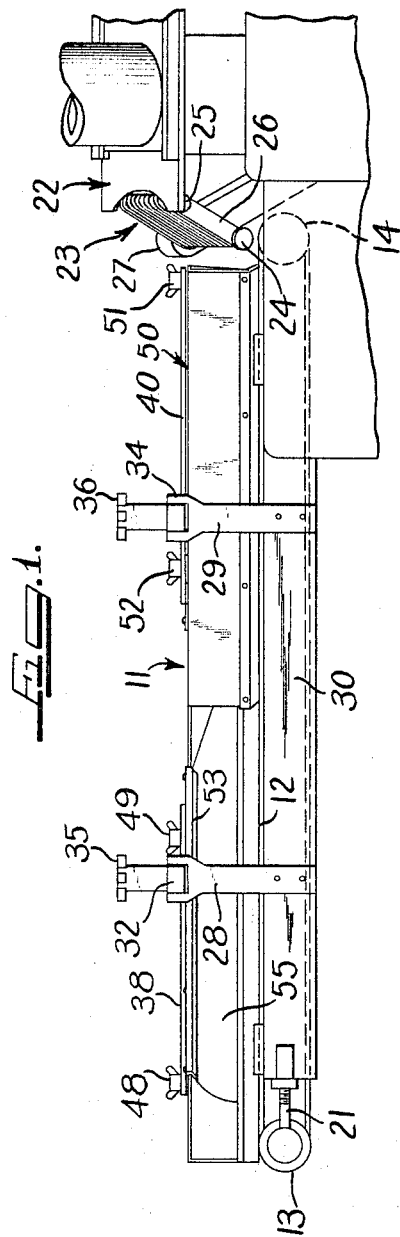
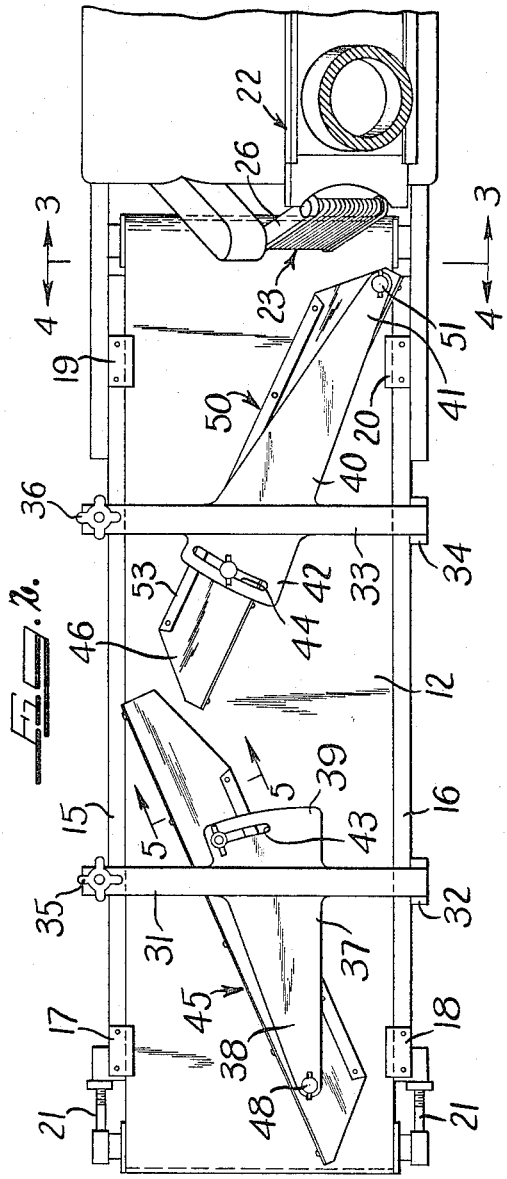
INVENTOR
HAROLD T. ATWOOD
BY
Benjamin Schlosser
Atty.

April 16, 1968     H. T. ATWOOD     3,377,965
ROUNDING APPARATUS FOR DOUGH
Filed March 23, 1966     2 Sheets-Sheet
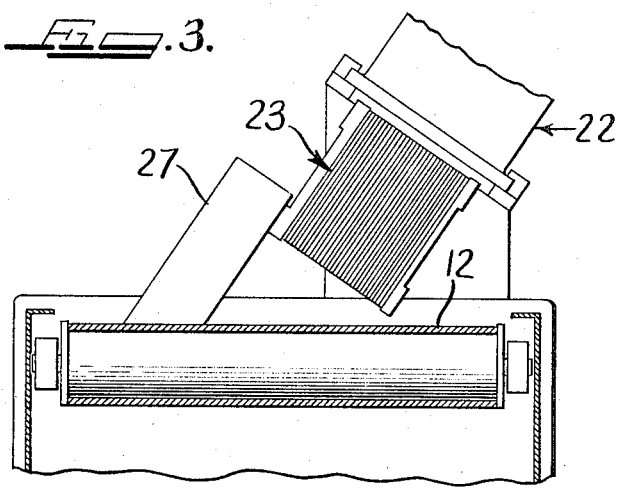
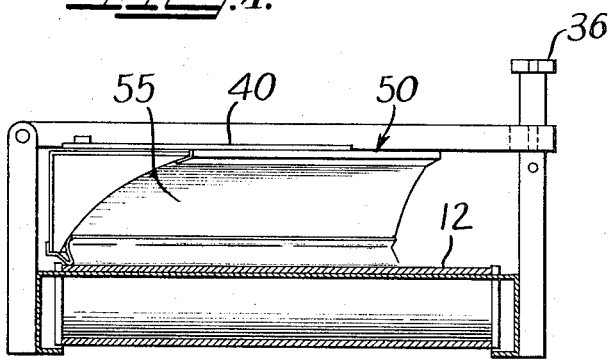
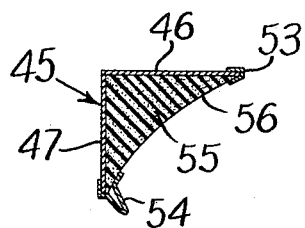
INVENTOR
HAROLD T. ATWOOD
BY
Benjamin Schlosser
Atty.

United States Patent Office 3,377,965
Patented Apr. 16, 1968

3,377,965
ROUNDING APPARATUS FOR DOUGH
Harold Thomas Atwood, Chicago, Ill.
(14152 Irving Ave., Dolton, Ill. 60419)
Filed Mar. 23, 1966, Ser. No. 536,850
2 Claims. (Cl. 107—9)

ABSTRACT OF THE DISCLOSURE

An endless belt conveyor is provided with a pair of trough-like members each mounted on a bar extending transversely above the belt. The trough-like members are angularly adjustable relative to the longitudinal axis of the belt and have a cushioning strip engageable with units of dough placed on the belt and movable therewith. The trough-like members impede the longitudinal travel of the dough units, round them into ball shape and give them uniform texture. The angularity of the trough-like members relative to the longitudinal axis of the belt controls the length of time each unit of dough is subjected to the rolling action.

This invention relates to a rounding apparatus for dough, and is particularly concerned with conveyor means adapted to receive individual units of dough of a predetermined size and to roll said units into balls of uniform size and texture as they are moved to the discharge end of the conveyor.

Individual units of dough are fed to a conveyor and as they are moved by the conveyor to its discharge end are engaged successively by a pair of trough-like members of uniform size that are spaced uniformly above the conveyor and are angularly disposed relative to each other and to the conveyor. The trough-like members may be adjusted so that they can work with individual units of dough of any size within a range of from one-half an ounce to twenty-four ounces in weight.

Suitable structure by means of which the above mentioned and other advantages of the invention are attained will be fully described in the following specification, taken in conjunction with the accompanying drawings showing a preferred illustrative embodiment of the invention, in which:

FIG. 1 is a side elevational view of one embodiment of the invention, showing the rounding apparatus with parts of a dough dividing machine adapted to feed the individual units of dough to the rounding apparatus;

FIG. 2 is a top plan view of the structure shown in FIG. 1;

FIG. 3 is an enlarged cross sectional view, taken along the line 3—3 of FIG. 2;

FIG. 4 is an enlarged cross sectional view taken along the line 4—4 of FIG. 2; and FIG. 5 is an enlarged cross sectional view taken along the line 5—5 of FIG. 2.

In the drawings, a rounding conveyor 11 comprises an endless belt 12 extending around rolls 13 and 14, either of which may be driven in conventiotnal manner. The belt 12 is positioned between two longitudinal rails 15 and 16, and is held in proper longitudinal alignment by a plurality of guide members 17, 18, 19 and 20 secured to the rails 15 and 16. Tensioning means 21 are provided adjacent the roll 13 to hold the belt 12 under proper tension at all times. The feeding end of the conveyor is spaced a short distance from the discharge end of a dough divider, indicated generally at 22, and at a lower level.

A short, substantially vertical conveyor 23 is positioned between the discharge end of the dough divider and the adjacent end of the conveyor 11. The conveyor 23 preferably comprises a plurality of closely spaced cords of any suitable rubber or plastic, such as, for example, polyurethane. The cords extend around two rollers 24 and 25 rotatably mounted in a frame 26 that is secured to the dough divider in any suitable manner. The lower roller 24 is rotated by drive means 27, but either roller may be driven. The conveyor 23 insures a positive drive for the units of dough as they are discharged from the dough divider, and also helps to keep the discharge end of the dough divider clean by removing therefrom any small scraps of dough that might otherwise accumulate and interfere with the orderly movement of dough from the divider.

Two upstanding support brackets 28 and 29 are secured to a plate 30 at one side of the conveyor 11 and extend a uniform distance above the upper reach of the belt 12. The brackets 28 and 29 are spaced longitudinally of the conveyor 11. A clamping bar 31 is hinged to the upper end of the bracket 28, as indicated at 32, and a similar bar 33 is hinged to the bracket 29 at 34. The opposite end of the bar 31 extends transversely across the belt 12 and is secured by a clamp screw 35 that may be adjusted to hold the bar 31 at any desired distance above the belt 12. The bar 33 is similarly secured by a clamp screw 36.

A flat wedge-shaped plate 37 is rigidly secured to the underside of the bar 31 with its narrow end 38 adjacent the discharge end of the conveyor 11 and its wide end 39 closer to the longitudinal center of the conveyor. A similar plate 40 is rigidly secured to the bar 33 with its narrow end 41 close to the feeding end of the conveyor and its wide end 42 closer to the longitudinal center of the conveyor 11. The plate 37 has an arcuate slot 43 in its wide end and the plate 40 has a similar slot 44 in its wide end.

An angular metal frame member 45 comprising a top wall 46 and a side wall 47 is supported by the plate 37 with its top wall parallel to the plate 37 and its side wall perpendicular thereto. The frame member is pivotally connected to the narrow end of the plate 37, as indicated at 48, and is connected to the wide end of the plate 37 by a screw 49 that projects through the arcuate slot 43. The frame member 45 may be moved pivotally about 48 to position it in any desired angular relationship relative to the belt 12, and may be secured in said position by tightening the screw 49.

Another angular frame member 50 is secured in similar manner to the plate 40 by a pivotal connection 51 adjacent the narrow end of the plate 40 and a screw 52 extending through the arcuate slot 44. The frame members 45 and 50 are duplicates, except that they are in reversed positions, and therefore only the member 45 will be described in detail. The same reference numerals will indicate identical structure on the frame members 45 and 50.

An angular strip 53 is secured to the outer longitudinal edge of the top plate 46, and a second angular strip 54 is secured to the longitudinal edge of the side wall 47. The angular strips 53 and 54 cooperate to hold a soft foamed cushioning strip 55 of any suitable soft material, preferably polyurethane, with two sides thereof juxtaposed against the top plate 46 and the side wall 47, as shown best in FIGURES 4 and 5. The strip 55 is approximately triangular in cross section except that its angular face 56 is slightly concave.

The dough fed into the dough divider is scaled into units of approximately uniform weight, and the units are discharged from the dough divider on to the conveyor 23 which carries them to the conveyor 11. As the units of dough are moved along the conveyor 11, the trough-like member 50 impedes the longitudinal movement of the dough on the conveyor belt 12. The member 50 is positioned at an angle of 15 to 30° from the longitudinal axis of the conveyor, depending upon the weight of the individual units of dough.

The longitudinal movement of the belt 12 carries each unit of dough into engagement with the concave face of the cushioning strip 55. The cushioning strip partially overlies the unit of dough and creates a drag on the top surface of the dough which causes it to resist the forward motion induced by the belt 12 and induces a rolling action on the dough as it moves forwardly on the conveyor. If the angle of the trough-like member to the longitudinal axis of the belt is less, the resistance to the longitudinal movement of the dough is less. Any increase in the angle of the member 50 to the belt 12 increases the drag on the top of the dough and increases the travel time of the dough on the belt 12, thus subjecting it to the rolling action for a longer period of time. The rolling action tightens the ball of dough and makes its texture more uniform.

If the rounder is adjusted for use with small units of dough, the angle of the trough-like member 50 is kept at a maximum, say, 30°, so that the dough will be subjected to rolling action for a maximum length of time. The minimum angle is used for the largest units of dough because a large ball of dough does not require as much rolling action to give it uniform texture. The trough-like member 50 requires some adjustment to allow more space for a larger ball, but, regardless of the size of the ball of dough, from one-half ounce to twenty-four ounces, the angular strip 54 is kept close to the belt 12 so that it can act as a scraper to prevent any of the dough from sticking on the belt 12.

As the belt 12 carries the ball of dough past the end of the trough-like member 50, the ball moves into engagement with the concave face of the cushioning strip 55 of the trough-like member 45. The end of member 45 closest to the feeding end of the conveyor 12 preferably extends into engagement with the longitudinal rail 15 to insure engagement with the ball of dough being rounded. The angular direction of the member 45 immediately changes the radius of rotation of the ball of dough as it changes the direction of its longitudinal movement. The action on the ball of dough is the same with both members 45 and 50, and the change in the direction of rotation insures that the dough is well rounded and of uniform texture as the belt 12 carries it past the member 45 to the discharge end.

Although I have described a preferred embodiment of the rounding apparatus in considerable detail, it will be understood that the description thereof is intended to be illustrative, rather than restrictive, as many details of structure may be modified or changed without departing from the spirit or scope of my invention. Accordingly, I do not desire to be restricted to the exact details of structure described.

I claim:

1. An apparatus for molding a unit of dough of nondescript shape into a rounded ball of substantially uniform texture comprising a conveyor for moving said dough longitudinally relative to said apparatus, two trough-like members located above said conveyor and positioned to successively engage dough moved by said conveyor and to provide resistance to the longitudinal movement of said dough, said trough-like members extending in different angular relationships relative to said conveyor whereby one of them causes said dough to rotate in one direction and the other causes it to rotate in a different direction after it has moved out of engagement with said first trough-like member, and scraper means secured to each of said trough-like members to prevent dough from sticking to said conveyor.

2. The apparatus recited in claim 1, in which each of said trough-like members comprises an angular metal frame holding a soft cushioning strip of approximately triangular cross section, the angular face of said cushioning strip being slightly concave.

References Cited
UNITED STATES PATENTS

| | | | |
|---|---|---|---|
| 936,661 | 10/1909 | Petri | 107—9 |
| 1,726,969 | 9/1929 | Wescott | 107—9 |
| 2,596,313 | 5/1952 | Wagoner | 107—9 |
| 2,790,397 | 4/1957 | Winkler | 107—9 |

FOREIGN PATENTS

| | | |
|---|---|---|
| 317,808 | 5/1934 | Italy. |

WALTER A. SCHEEL, *Primary Examiner.*

A. O. HENDERSON, *Assistant Examiner.*